(12) United States Patent
Beeler et al.

(10) Patent No.: US 10,505,777 B2
(45) Date of Patent: *Dec. 10, 2019

(54) SOFTWARE BASED CLOUD COMPUTING MODULATOR / DEMODULATOR MODEM

(71) Applicant: Envistacom, LLC, Atlanta, GA (US)

(72) Inventors: Michael Beeler, Jefferson, MD (US); Kasra Toyserkani, Rockville, MD (US)

(73) Assignee: Envistacom, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/456,322

(22) Filed: Jun. 28, 2019

(65) Prior Publication Data

US 2019/0327122 A1  Oct. 24, 2019

Related U.S. Application Data

(63) Continuation of application No. 16/213,569, filed on Dec. 7, 2018, now Pat. No. 10,397,038, which is a continuation of application No. 15/782,651, filed on Oct. 12, 2017, now Pat. No. 10,177,953.

(60) Provisional application No. 62/523,713, filed on Jun. 22, 2017.

(51) Int. Cl.
| | |
|---|---|
| *H04L 27/06* | (2006.01) |
| *H04L 27/26* | (2006.01) |
| *H04L 29/08* | (2006.01) |
| *H04L 12/24* | (2006.01) |
| *H04L 27/00* | (2006.01) |

(52) U.S. Cl.
CPC ...... *H04L 27/2649* (2013.01); *H04L 27/0002* (2013.01); *H04L 41/044* (2013.01); *H04L 67/10* (2013.01); *H04L 67/1031* (2013.01); *H04L 27/0012* (2013.01)

(58) Field of Classification Search
CPC . H04L 25/067; H04L 1/0045; H04L 27/2647; H04B 1/123
USPC ......... 375/340, 222, 227, 330; 717/101, 140
See application file for complete search history.

(56) References Cited

U.S. PATENT DOCUMENTS

| | | |
|---|---|---|
| 8,089,993 B2 | 1/2012 | Wei et al. |
| 8,542,755 B2 | 9/2013 | Kopmeiners |
| 9,065,699 B2 | 6/2015 | Stratigos, Jr. |
| 9,112,758 B2 | 8/2015 | Niu et al. |
| 9,264,125 B2 | 2/2016 | Moshfeghi |

(Continued)

FOREIGN PATENT DOCUMENTS

| | | |
|---|---|---|
| WO | 2017203534 A1 | 11/2017 |
| WO | 2018104929 A1 | 6/2018 |

OTHER PUBLICATIONS

International Search Report and Written Opinion of International Patent Application No. PCT/US18/38397 dated Jul. 27, 2018.

*Primary Examiner* — Khai Tran
(74) *Attorney, Agent, or Firm* — McBee Moore Woodward & Vanik IP, LLC

(57) ABSTRACT

An all-digital software-only modem using distributed processing resources of cloud computing is provided. In particular, all processes that were previously supported by purpose built software, firmware, Field Programmable Gate Array (FPGA) hardware description language (HDL) firmware, and an Application Specific Integrated Circuit (ASIC) are in the instant disclosure supported entirely by a High Performance Computing (HPC) server inside a cloud computing environment.

6 Claims, 11 Drawing Sheets

(56) References Cited

U.S. PATENT DOCUMENTS

| | | |
|---|---|---|
| 9,893,774 B2 | 2/2018 | Shattil |
| 10,064,149 B1 | 8/2018 | Anvari |
| 10,311,002 B2 | 6/2019 | Kawai et al. |
| 2008/0112361 A1 | 5/2008 | Wu |
| 2014/0123101 A1 | 5/2014 | Kim |
| 2014/0376418 A1 | 12/2014 | Banerjea |
| 2015/0036664 A1 | 2/2015 | Yuk et al. |
| 2016/0134376 A1 | 5/2016 | Mateosky et al. |
| 2016/0227396 A1 | 8/2016 | Lee et al. |
| 2017/0126260 A1* | 5/2017 | Torbatian .............. H04L 7/0008 |
| 2017/0367277 A1* | 12/2017 | Mohindra .............. A01G 22/00 |

* cited by examiner

SOFTWARE BASED CLOUD COMPUTING MODULATOR / DEMODULATOR MODEM

CROSS-REFERENCE TO RELATED APPLICATIONS

This application is a Continuation of U.S. patent application Ser. No. 16/213,569, filed 7 Dec. 2018, which is a Continuation of U.S. patent application Ser. No. 15/782,651, filed 12 Oct. 2017 (now U.S. Pat. No. 10,177,952), which claims priority to U.S. Provisional Application No. 62/523,713, filed 22 Jun. 2017, the disclosures of which are incorporated in their entirety herein by reference. This application is also related to PCT/US2018/038397 filed 20 Jun. 2018.

BACKGROUND

Since the introduction of communications, a purpose built device known as a modulator/demodulator or as commonly known as a "modem" is utilized to accept user information, modulate the user data into a format known as a waveform and transmit over a medium. Conversely, a modem contains the ability to receive a modulated waveform and demodulate the waveform to the original user data at the receiving end. The combined collection of a modulator, transmission medium, and demodulator is known in the art as a communications path. Traditionally, a modem is a purpose built device using specialized parts with specialized software and/or firmware to create a modem. As of the last few years, a new concept known as a software defined modem (SDM) has entered practice using a relatively generic printed circuit board (PCB) set with a general modulator and demodulator board with the intent that a general processor can support a software package on a somewhat generalized modem set to create a modem.

FIELD

The described invention uses an "all software" approach for the creation of a modem within the distributed computing fabric known as "cloud computing" that is supported with commercial off the shelf (COTS) hardware know as High Performance Computing (HPC) servers. The HPC architectures are now being supported by the distributed processing companies such as Amazon Web Services (AWS), Google Cloud Computing, Microsoft's Azure, etc. The architectures being supported by the cloud computing companies are also known to support or enable software defined networking (SDN). The method described provides the ability for someone skilled in the art, e.g., a software architect, network engineer, or modem designer to understand the concepts described in this disclosure.

RELATED ART

This disclosure relates to methods of describing a modulator and/or demodulator (modem) that is created using a high-level programming language such as OpenCL, C, C++, etc. and implementing the high-level programming language as an application on a cloud-based HPC platform within a distributed computing architecture. The described methods provide the description of how an all software modem can be created using a high-level computing language, and supported in a cloud-based architecture for the creation of a communications waveform using an all-digital computing device. The described method can be utilized to provide similar or higher performance in every aspect of a hardware or dedicated (purpose built) modem or a software defined modem (SDM) using the processing resources available within a cloud-based processing architecture. Furthermore, the described approach can perform the waveform processing in real time.

In the prior art, a typical communications modem that supports a communications link for satellite, tactical radio, or terrestrial communications is comprised of a user data interface and accepts user data in the form of a digital stream utilizing various synchronous and asynchronous formats and protocols. The modulator portion of the modem accepts the user data and performs the process of modulating the data into a signal that is suitable for the transmission medium. The actual process of the transformation from the user data to the modulated signal is carried out by a purpose-built piece of hardware consisting of discrete components, logic devices, and low-level programming language to provide the directives for the hardware to accomplish the steps required to create the final waveform to be transmitted over the transmission medium. Conversely, the demodulator portion of the modem performs the reverse process-again, all carried out by a purpose built piece of hardware consisting of discrete components, logic devices, and low-level programming language to provide the directives for the hardware to accomplish the steps required to accept a waveform over the transmission medium and perform the steps to return the user data.

The present disclosure covers how the steps required to accomplish the modulation of user data in the form of Ethernet frames and IP packets may be accomplish in an all-digital cloud computing environment using COTS processing hardware without the need of any purpose-built hardware. The entire modulation and demodulation process that comprises a modem, may be accomplished in an all software modem using cloud computing fabric that would be used for a SDN network.

BRIEF SUMMARY

This disclosure relates to, but is not limited to, providing an all-digital software only modem using the resources distributed processing resources of cloud computing. Traditionally, a typical communications modem that supports a communications link for satellite, tactical radio, or terrestrial link is comprised of a network user interface and accepts user data in the form of a digital stream utilizing various synchronous and asynchronous protocols. The modulator portion of the modem accepts the user data and performs the process of modulating the data into a format that is suitable for the transmission medium. The actual process of the transformation from the user data to the modulated stream is carried out by a purpose-built piece of hardware consisting of discrete components, logic devices, and low-level programming language to provide the directives for the hardware to accomplish the steps required to create the final waveform to be transmitted over the transmission medium. Conversely, the demodulator portion of the modem performs the reverse process—again, all carried out by a purpose-built piece of hardware consisting of discrete components, logic devices, and low-level programming language to provide the directives for the hardware to accomplish the steps required to accept a waveform over the transmission medium and perform the steps to return the user data back to the digital stream.

The disclosed invention uses the described techniques and results in one or more descriptions to support the creation and manipulation of an all software digital modem using the distributed nature of the cloud computing fabric using the resources available today and planned for the future. The cloud computing fabric is also utilized to provide resources for software defined networking.

Particular implementations described herein are and may use, but is not limited to programs, computer programming languages, microprocessors, Application Specific Integrated Circuits (ASICs), Field Programmable Gate Arrays (FPGAs), and combinations of CPUs and FPGAs to form High Performance Computing (HPC) servers.

Aspects of this disclosure relate to a method and system for creating an all software digital modem using the distributed processing resources of cloud computing.

DETAILED DESCRIPTION

This disclosure, its aspects and implementations, are not limited to the specific processing techniques, components, modulation formats, frequency examples, or methods disclosed herein. Many additional components and assembly procedures known in the art consistent with the creation and manipulation of a waveform by a modulator and demodulator (modem) are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

Particular implementations of an all software digital modem as an application using cloud computing resources for a communications system is described. However, as will be clear to those of ordinary skill in the art from this disclosure, the principles and aspects disclosed herein may readily be applied to any modulation, demodulation, and modulation/demodulation device known hereafter as a modem for the creation of a waveform to be carried over a transmission medium for Intermediate Frequency (IF), Radio Frequency (RF), and optical communications systems, such satellite, tactical radio, and terrestrial transmission without undue experimentation.

Figure 1:
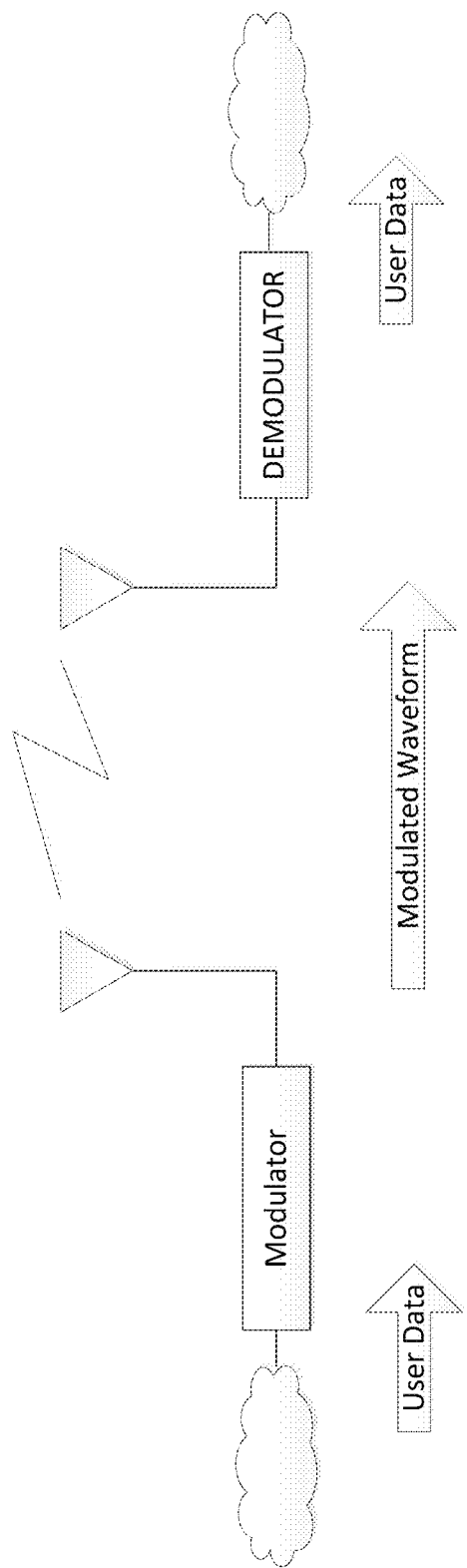
FIG. 1 shows the prior art using purpose built modulator and demodulator hardware for supporting a waveform.

FIG. 1 illustrates the prior art of a particular implementation of a communications transmission system wherein the forward path (transmitting station to a receiving station) where transmit station contains a transmit modulator and the receiver contains a receiving demodulator. The modem in the prior art is a purpose-built device, typically a dedicated "box" that transmits and is called a modulator. The modulator outputs either an intermediate frequency (IF) that may be unconverted to a radio frequency (RF) or directly output from the modulator as a radio frequency, possibly power amplified, and transmitted through free-space, to an airborne, or satellite repeating relay. At the receiving station, the receive modem in the prior art is a purpose-built device, typically a dedicated "box" that receives and is called a demodulator. The demodulator receives (inputs) either an intermediate frequency (IF) that may be down converted from a radio frequency (RF) or directly input from the receive antenna as a radio frequency signal.

Figure 2:
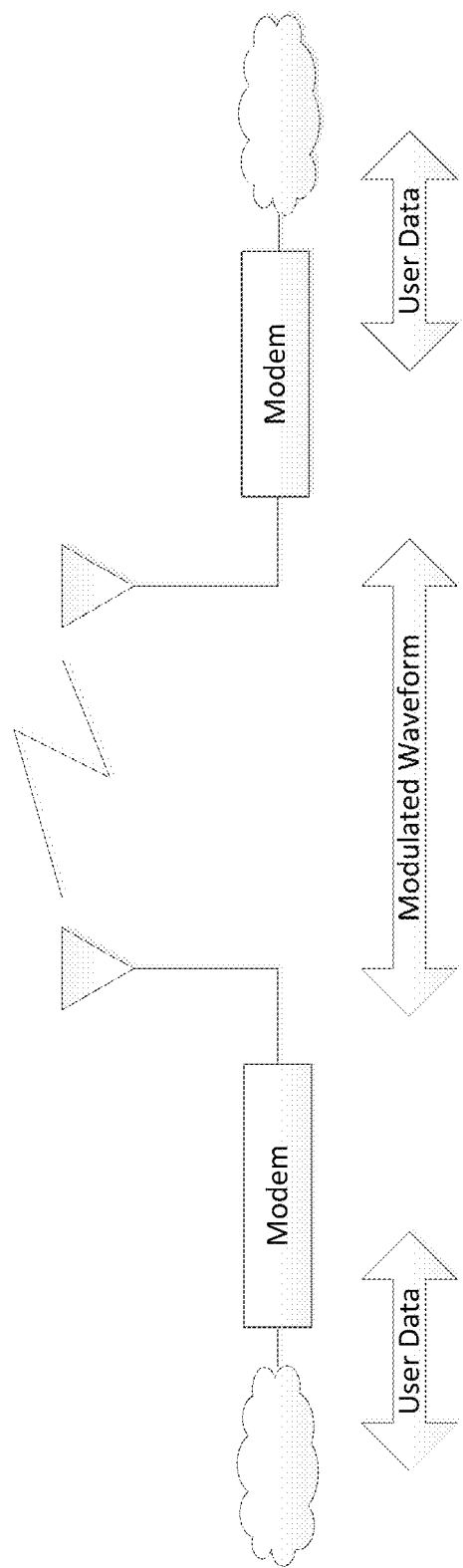
FIG. 2 shows the prior art using purpose built combination modulator and demodulator (modem) hardware for supporting a waveform.

FIG. 2 Is an alternate embodiment, of the prior art where the modulator and demodulator are combined in a single device known as a modulator/demodulator also known as a modem. As a modem, each station may contain a modem that provides both transmit and receive capability, modulation and demodulation, respectively. The modem at each station may provide a full-duplex communications path.

Figure 3:
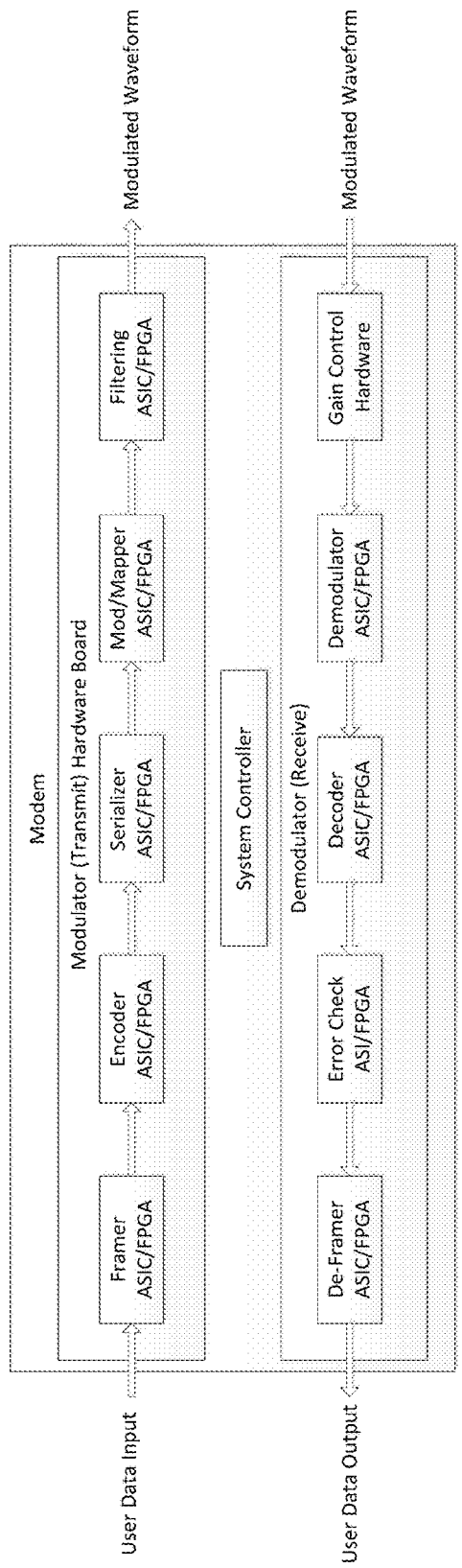
FIG. 3 shows the prior art of a modem's components to support the modulation and demodulation capabilities with purpose built hardware.

FIG. 3 shows the prior art with each component of a purpose-built modem using specialized hardware that comprises both the transmit or modulation path, and the receive or demodulation path. The individual processing modules as specialized hardware devices and processing modules written in a low-level specialized hardware description language (HDL) is shown.

For the specialized box that is shown in FIG. 3, the top row of boxes (functions) show the various stages that are required to accept user data which is in many cases, but not limited to Ethernet (frames) and IP (packets). The user data is then accepted as bytes of data into an Application Specific Integrated Circuit (ASIC), FPGA using a HDL language, where it is framed into a suitable transport frame with header information (control bytes, sequence number, type information, etc.) and error checking is added. The next stage is the data is encoded with Forward Error Correction (FEC) information for data recover at the distant end. In many implementations, this function is a dedicated hardware device or an ASIC. In the next stage, the data is then taken from a parallel format to a serial format by a firmware function such as an ASIC or FPGA using a HDL language. The next section accepts the serial data stream and then performs the mapping of the bits into symbols to create a waveform constellation as modulated data. The modulated data is then filtered (pulse shaped) with a digital filter implemented in an ASIC or FPGA using a HDL language. In the specialized modulator or modulator section of a modem, the output then flows to a Digital to Analog Converter (DAC) or to a digital output stream to another stage of processing via Ethernet (frames) and IP (packets). The entire process must pass between multiple technologies of ASIC, FPGA using a HDL language, discrete components, etc. before a final waveform has been created. Continuing with FIG. 3, the receive (demodulation) chain, performs the reverse functionality as the transmit (modulation) chain. First it is assumed an Analog to Digital Converter (ADC) has accepted an incoming analog waveform and digitized the signal or the signal was received over a digital stream such as Ethernet (frames) and IP (packets). The input on the bottom row, right side show the first step is to perform gain control and is performed by a hardware device to add amplification or attenuation. The next step is to perform the demodulation of the incoming stream into de-mapped data bits. This step is performed by an ASIC or FPGA using a HDL language. The next step is to pass the stream to a FEC decoder. FEC decoding is a hardware intensive function and it typically carried out by an ASIC or FPGA using a HDL language. The next step is to verify the integrity of the data via error checking and is performed by an ASIC, FPGA using a HDL language, or a system processor. The next step is to de-frame the frames and remove any control and error checking overhead bits and pass to the user the recovered digital stream.

As shown in FIG. 3, the entire configuration of the modem is controlled by a system controller. The system processor is a dedicated hardware device that controls the entire modem. The system controller (control processor) manages the entire unit's health, status, configuration, setup, error checking and in many cases performs the user interface.

FIG. 3 can also be used to describe a new technique called Software Defined Modem (SDM) or Software Defined Radio (SDR). Similar to a dedicated modem, the SDR technology supported by GNU Radio and companies such as Ettus Research, these are dedicated hardware boards that are purpose built to support many types of waveforms, but ultimately rely on a dedicated/purpose built piece of processing hardware to support waveform processing.

Figure 4:
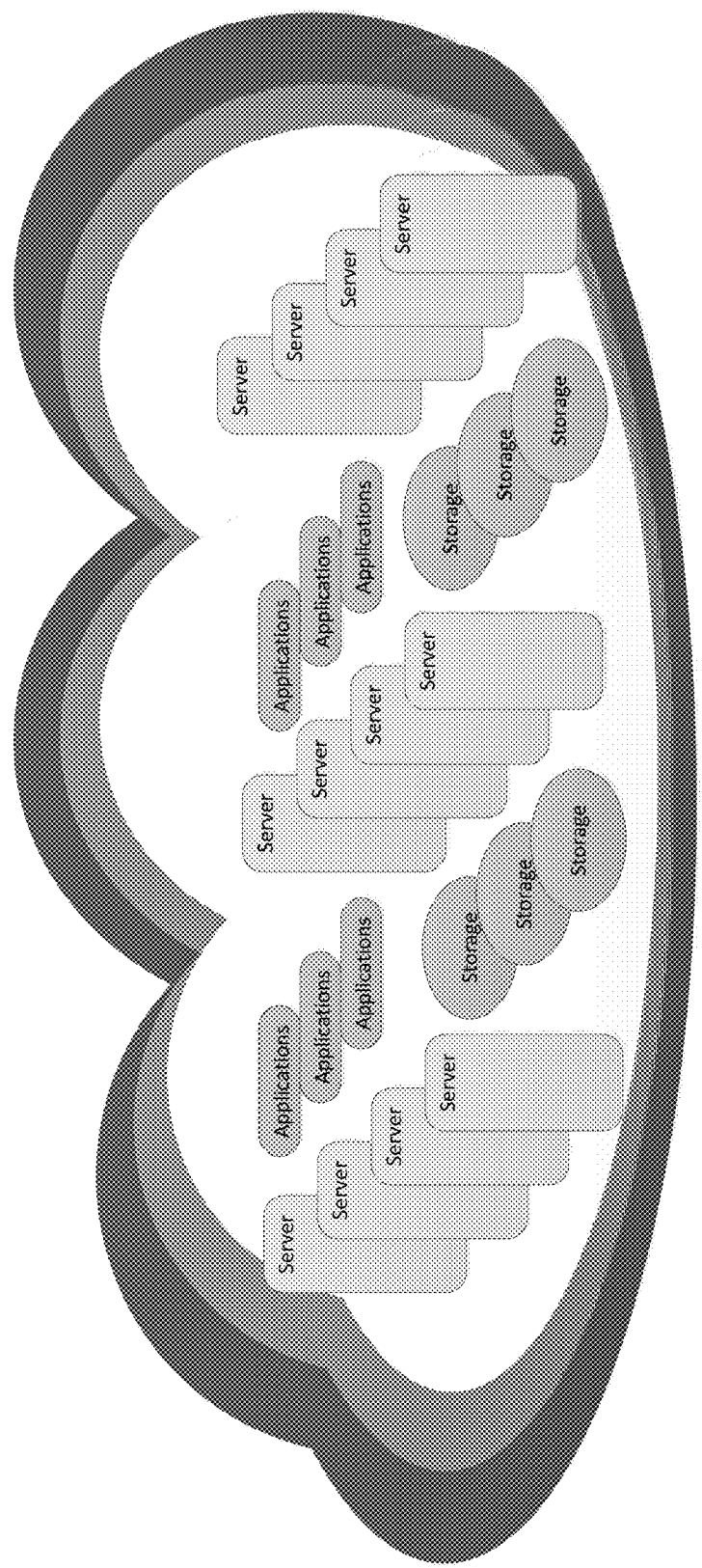
FIG. 4 shows the cloud computing fabric containing servers (processors), storage, applications, etc.

FIG. 4 shows the high-level representation of cloud computing environment. As shown, the cloud computing or distributed processing architecture has moved all processing, applications, and storage into the cloud. Companies such as Amazon Web Services (AWS), Microsoft Azure, Google Cloud Computing, etc. are developing massive infrastructures as depicted in FIG. 4, and is commonly called a SDN.

Figure 5:
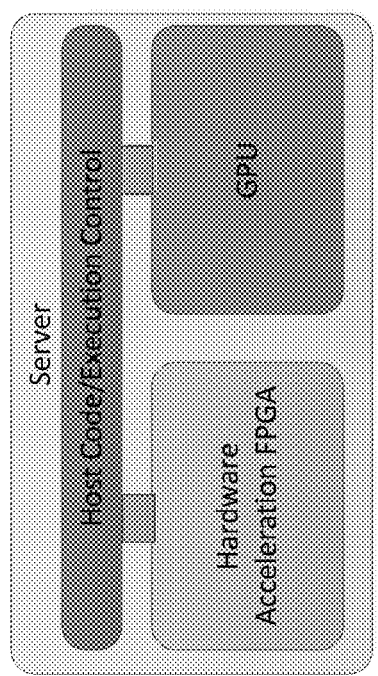
FIG. 5 shows the next generation HPC server technology containing a CPU/GPU and hardware acceleration card.

FIG. 5 shows the next generation server/processor architecture. No longer can CPU/GPU based PC's processors keep up with the processing demands of the user data/ information required to be handled by the Internet. Instead, the cloud computing providers are adding hardware assisted modules to their servers, e.g. Amazon Web Services F1 architecture as well Microsoft's Azure. These new HPC architectures with hardware assist now offer the hardware acceleration capabilities to support real-time high-speed processing for SDN environments. With these new hardware processing enhancements, a new computing language has been introduced called OpenCL. OpenCL has been introduced to allow the code to be written in a high level of abstraction that is hardware agnostic, and can take advantage of hardware acceleration technology in servers in a distributed computing environment. The described invention uses OpenCL, but any high-level language capable of supporting the combined processing of a CPU/GPU with hardware assistance would be covered by covered by the described invention.

Figure 6:
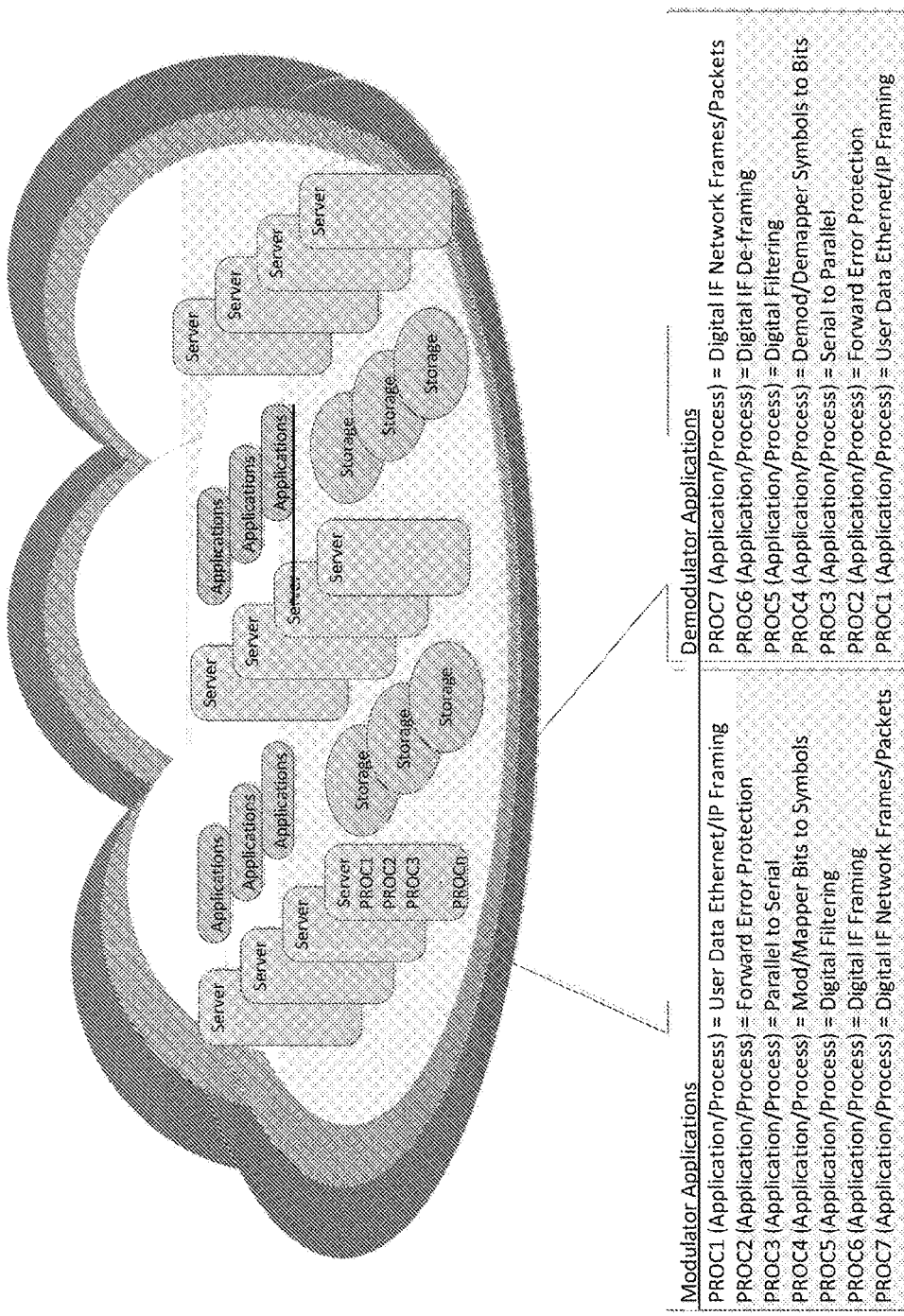
FIG. 6 shows the described invention with all modem processes (PROC1, PROC2, and PROC3) being supported by a single cloud computing server.

FIG. 6 shows the novelty of the invention where all processes that are supported by purpose built software, firmware, FPGA HDL firmware, and an ASIC are being supported entirely by a the HPC server inside the cloud computing environment. The processes shown on FIG. 6 PROC1, PROC2, and PROC3 are representations of the various modem processes. It should be noted the PROC1, PROC2, PROC3, . . . . PROCn (processes and/or applications) are functional blocks or algorithms running on the CPU (×86) or any one of the hardware acceleration units, such as FPGA, GPU, or DSP, that combined constitute the implementation of a communications waveform. The functional blocks are targeted for particular HPC resource according to the performance profiling of the waveform, which identifies algorithms that need to be hardware accelerated to achieve performance comparable to purpose built hardware. The process representing the modem processes/ applications are as follows:

It may be assumed user data is already available inside the cloud computing environment as Ethernet (frames) and IP (packets) and are directed to the modem processes as follows:

PROC1 (application/process) provides the framing into a suitable transport frame with header information (control bytes, sequence number, type information, etc.) and error checking is added.

PROC2 data is encoded with Forward Error Correction (FEC) information for bit error correction at the receiver. This function replaces the dedicated hardware device or an ASIC and is entirely supported by a high-level software language (i.e. OpenCL) and by the HPC architecture.

PROC3 the data is then taken from a parallel format to a serial format. This replaces the firmware function supported by an ASIC or FPGA using a HDL language with a function known as a serializer and is entirely supported by a high-level software language (OpenCL) targeting the HPC architecture.

PROCn (where n is the nth order process of a multiple processing architecture) then accepts the serial data stream and then performs the mapping of the bits into symbols to create a waveform constellation as modulated data.

PROCn+1 function replaces the digital filter implemented in an ASIC or FPGA using a HDL language and is entirely supported by a high-level software language (OpenCL) and is supported by the HPC architecture.

Figure 8:
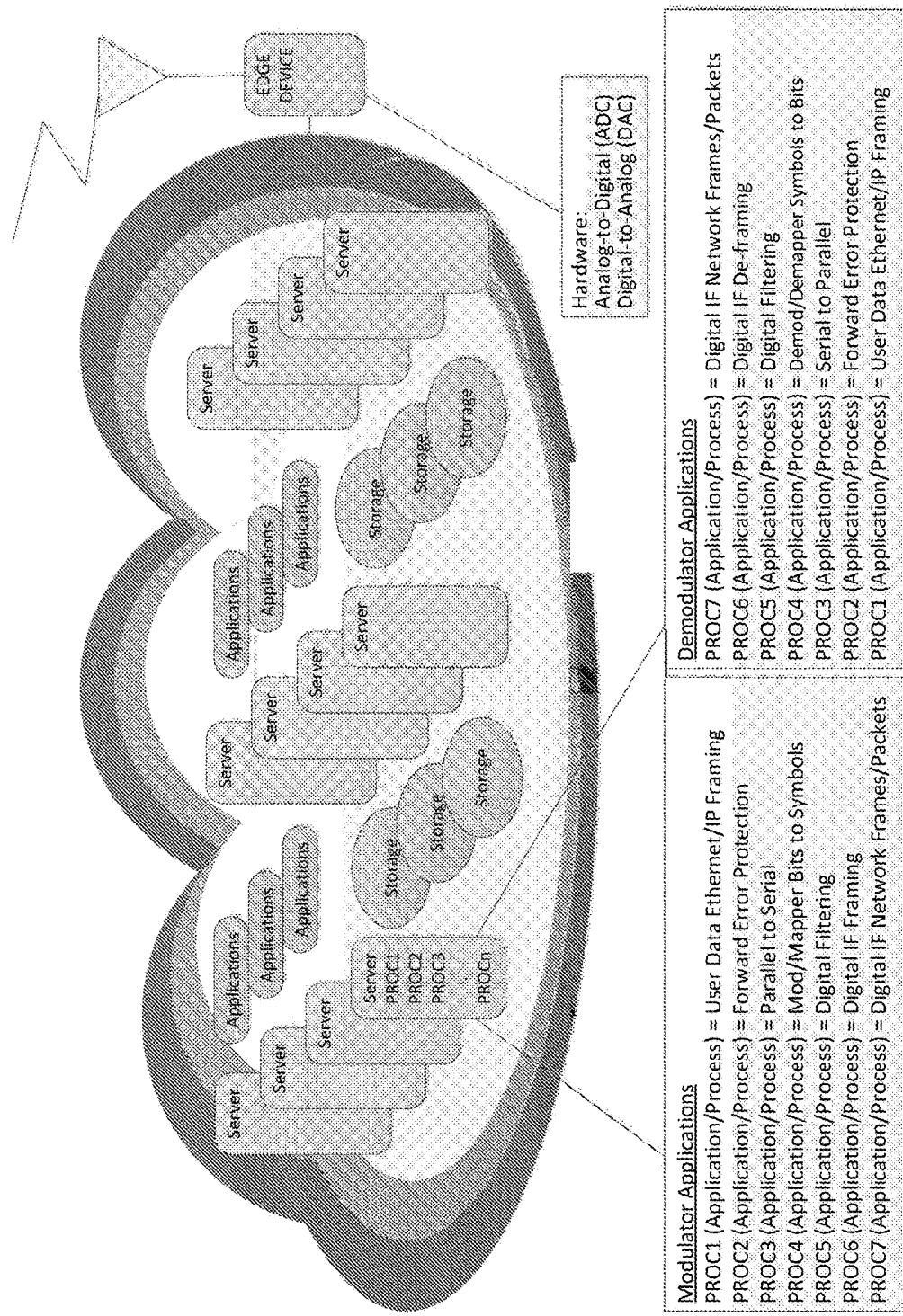
FIG. 8 shows the described invention with all modem processes (PROC1, PROC2, PROC3, and PROCn) being supported by a single cloud computing server and passed to an edge device for converting the digital stream of modulated signal created in the cloud computing environment passed to an edge processing device.

In the specialized modulator or modulator section of a modem, the output then flows to a Digital to Analog Converter (DAC) or to a digital output stream to another stage of processing via Ethernet (frames) and IP (packets). FIG. 8 is an alternate embodiment, an edge device can be placed on the edge of the cloud computing architecture, and egresses to a conversation device where it is then converted from an entirely digital format to an analog format suitable for transmission.

Continuing with FIG. 6, the receive (demodulation) chain, performs the reverse functionality as the transmit (modulation) chain. In FIG. 6, the PROCn processes can be any function that is desired in any order for providing the various stages of waveform processing within the cloud computing environment. As previously described, the receive section can operate with a previously digitized waveform from another source in the cloud computing environment. As shown in FIG. 3, the input on the bottom row, right side shows the first step is to perform gain control and is performed by a hardware device to add amplification or attenuation. This function replaces the gain/attenuation control provided by a hardware device, and is replaced by an application/process by a high-level software language (OpenCL) and is supported by the HPC architecture. The next step is to perform the demodulation of the incoming stream into de-mapped data bits. This step is performed by an ASIC or FPGA using a HDL language, and is replaced by an application/process, a high-level software language (OpenCL) and is supported by the HPC architecture. The next step is to pass the stream to a FEC decoder. FEC decoding is a hardware intensive function and it typically carried out by an ASIC or FPGA using a HDL language, and is replaced by an application/process, a high-level software language (OpenCL) and is supported by the HPC architecture. The next step is to verify the integrity of the data via error checking and is performed by an ASIC, FPGA using a HDL language, or a system processor, and is replaced by an application/process, a high-level software language (OpenCL) and is supported by the HPC architecture. The next step is to de-frame the frames and remove any control and error checking overhead bits and pass to the user as digital stream, and is typically provided by an ASIC or FPGA using an HDL language or a system processor, and is replaced by an application/process, a high-level software language (OpenCL) and is supported by the HPC architecture.

FIG. 8 shows an alternate embodiment, an edge device Analog to Digital Converter (ADC) has accepted an incoming analog waveform and digitized the signal or the signal was received over a digital stream such as Ethernet (frames) and IP (packets) before passing the digitized waveform into the cloud computing environment.

Figure 7:
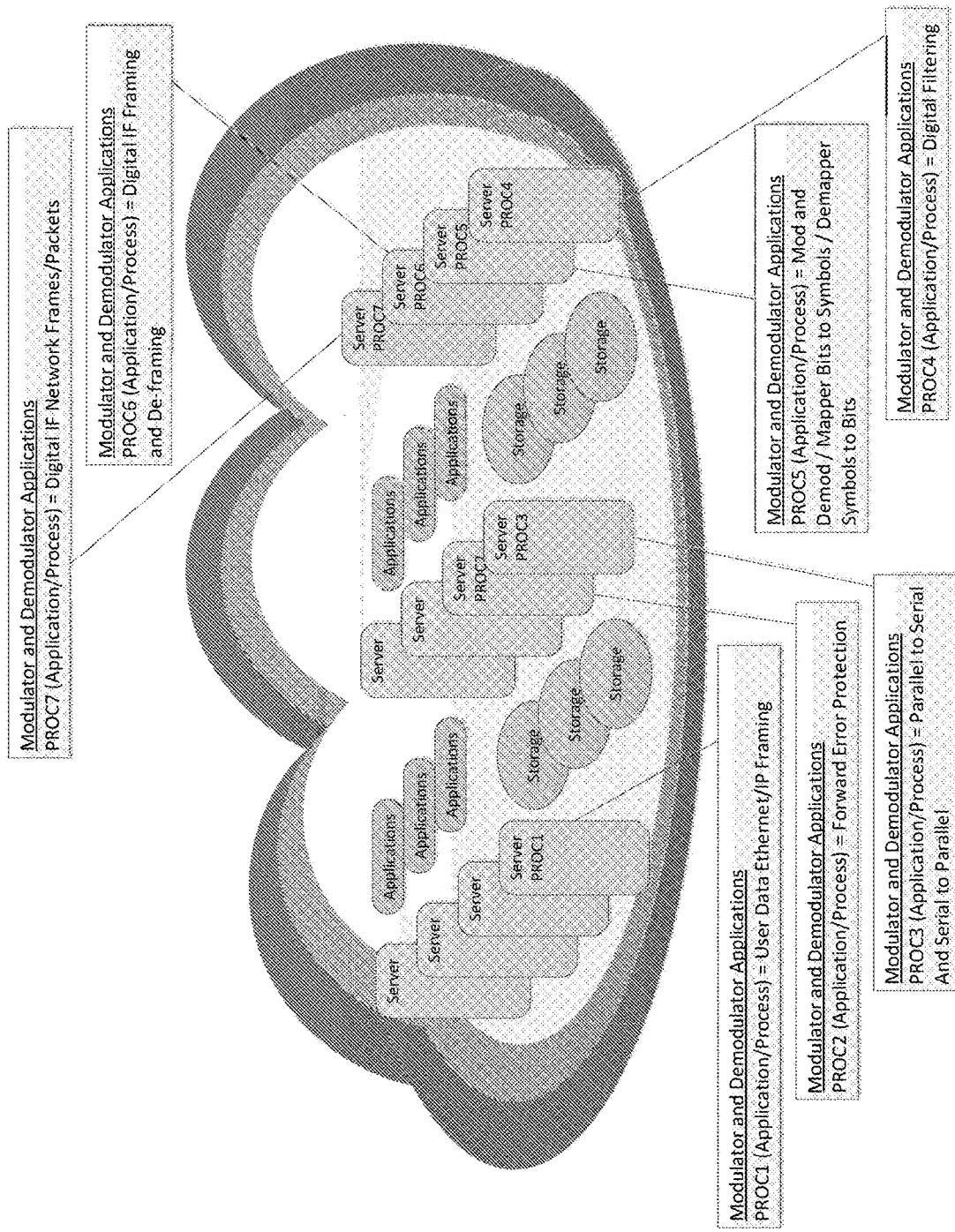
FIG. 7 shows the described invention with all modem processes (PROC1, PROC2, and PROC3) being supported by a multiple cloud computing server lower left (PROC1), lower center server (PROC2), and lower right server (PROC3).
Figure 9:
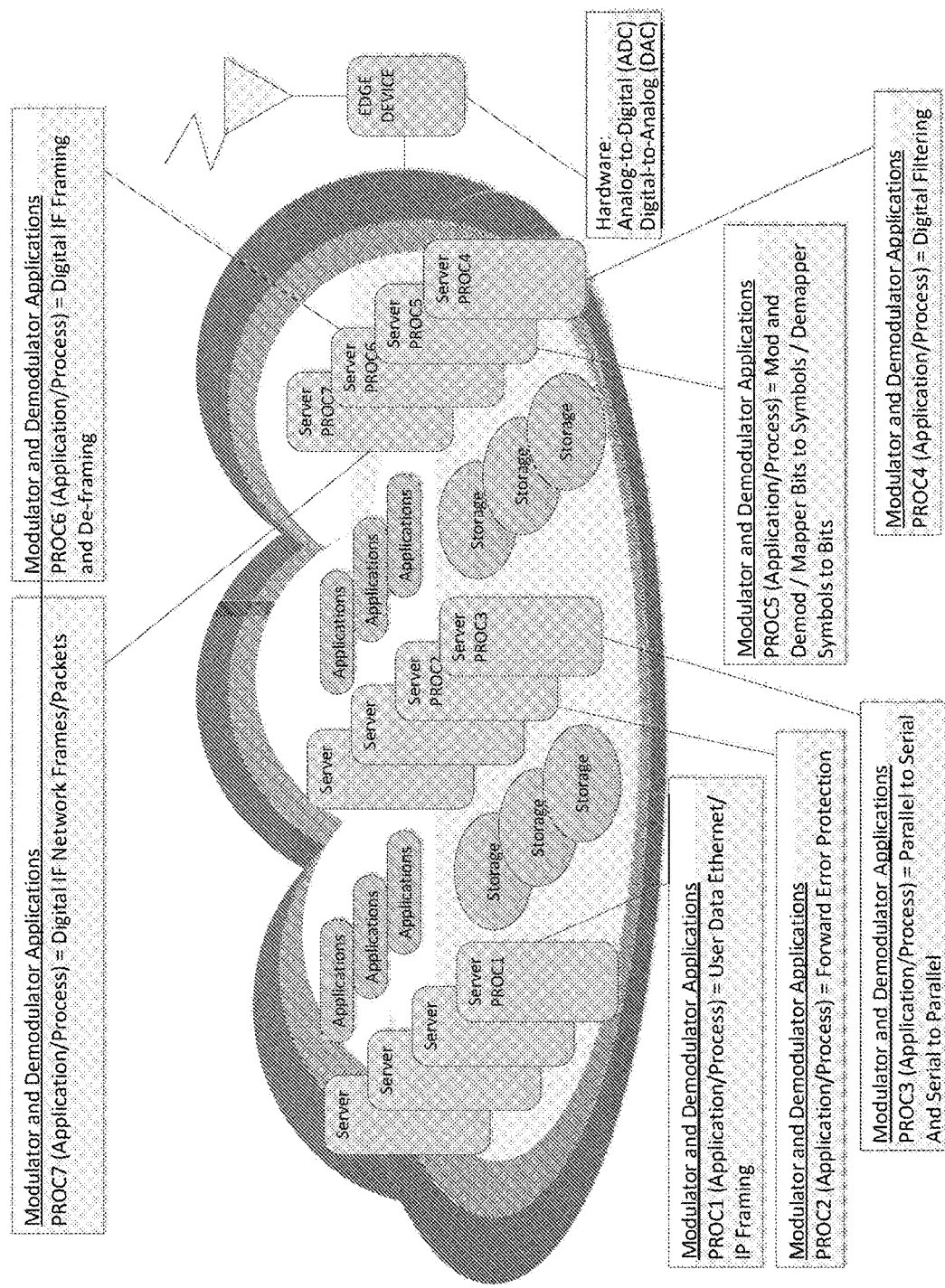
FIG. 9 shows the described invention with all modem processes (PROC1, PROC2, and PROC3) being supported by a multiple cloud computing server lower left (PROC1), lower center server (PROC2), and lower right server (PROC3), and several applications/processes being supported on other servers for PROC4 and PROC5) and passed to an edge device for converting the digital stream of modulated signal created in the cloud computing environment for transmission over the medium.

FIG. 7 shows an alternate embodiment where the processes may be supported by a separate processor (hardware or virtual) in them physical location or different location, using the same HPC architecture or different architecture, and same or different CPU architectures. FIG. 9 represents an edge device supporting the distributed processing of FIG. 7. It is noteworthy, the architectures of FIGS. 4, 6, 7, 8, 9, 10, and 11 showing the processing of the waveform may be completely flexible.

Figure 10:
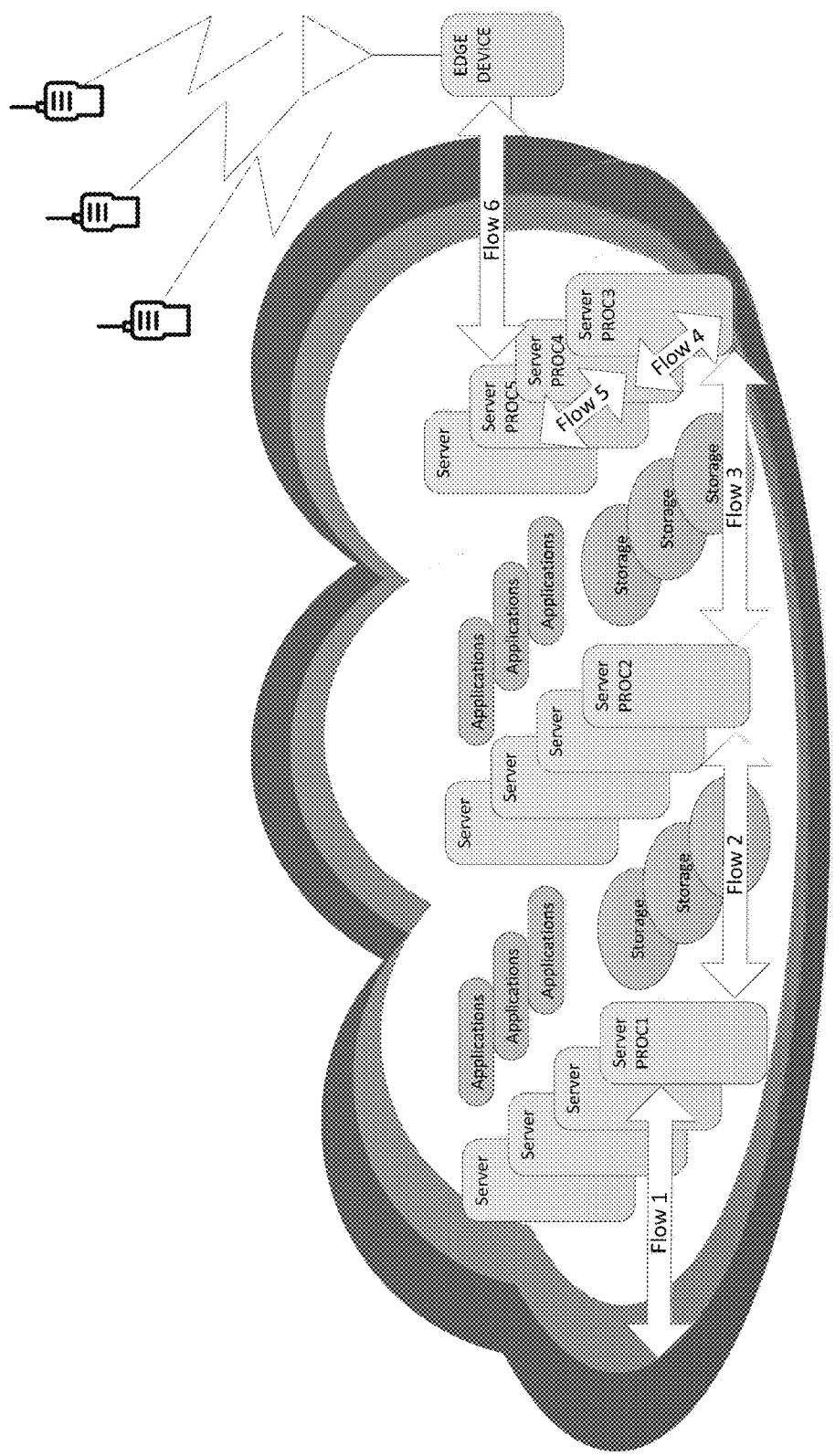
FIG. 10 shows the described invention with all modem processes (PROC1 to PROC5 for the forward return path) being supported by a multiple cloud computing servers with flows between each of the processes residing on multiple servers distributed throughout the cloud.
Figure 11:
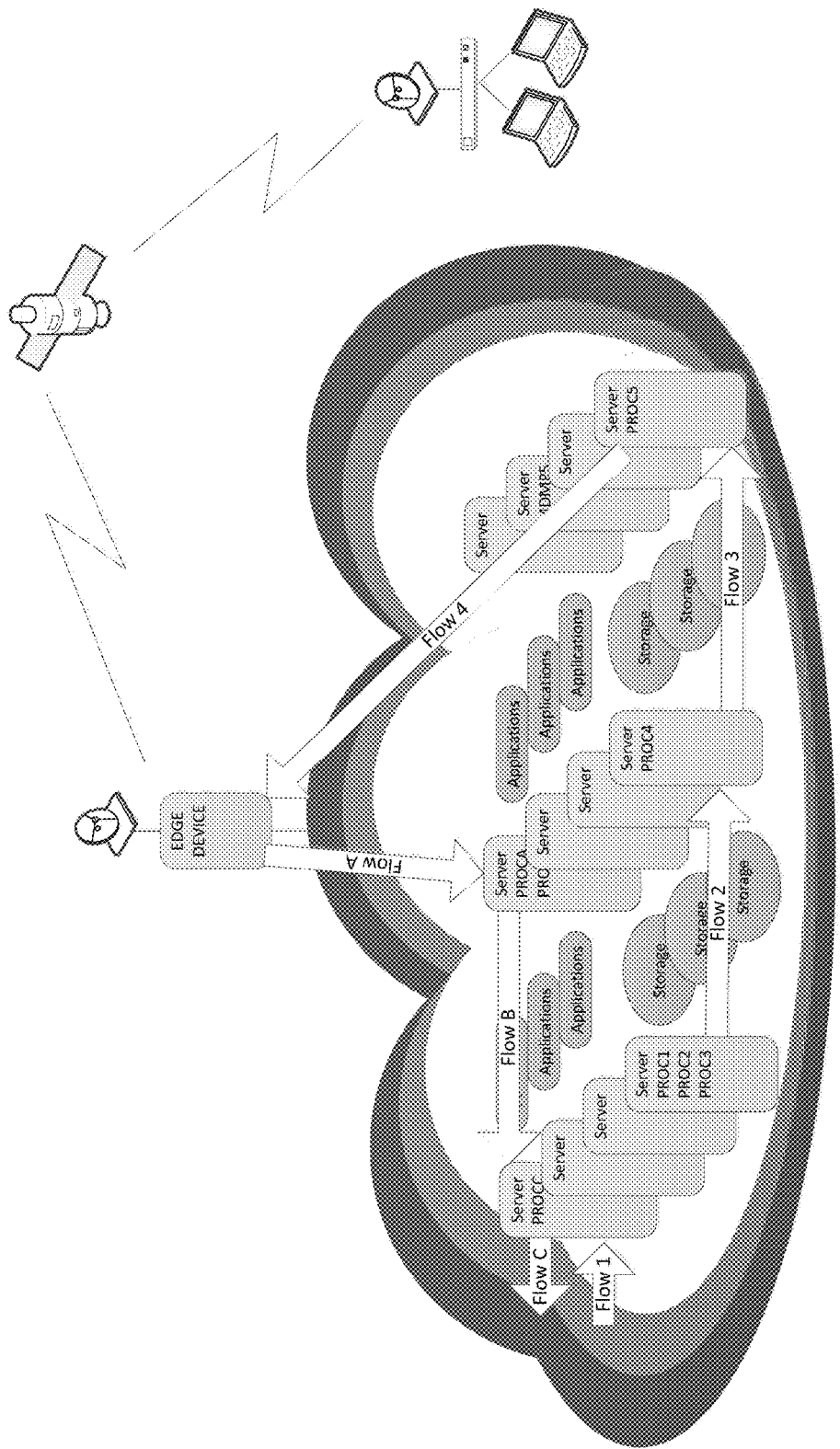
FIG. 11 shows the described invention with all modem processes (PROC1 to PROC5 for the forward path and PROCA to PROCC for the return path) being supported by multiple cloud computing servers with flows between each of the processes residing on multiple servers distributed throughout the cloud.

FIG. 10 shows the novelty of the invention where all processes are distributed throughout the cloud computing environment. Flow 1 represents the user network data entering the network containing the cloud computing architecture. It may be assumed user data is encapsulated as Ethernet (frames) and IP (packets). PROC1 provides the framing into a suitable transport frame with header information (control bytes, sequence number, type information, etc.) and error checking is added. FIG. 10 does not explicitly show a timing process, but the network packets being passed between each of the servers and processes in the cloud computing environment must have a timestamp for all packets, so it is clearly understood that in the control header of the all the information being moved from process to process has a high-resolution time stamp that maybe used such, but not limited to, the Real Time Protocol (RTP), etc.

Flow 2 directs the formatted network data from PROC1 to process PROC2 provides the Forward Error Correction (FEC) information for data recover at the distant end.

Flow 3 directs the waveform with FEC information from PROC2 to process PROC3 where the data is then taken from a parallel format to a serial format.

Flow 4 directs the waveform data in serial format from PROC3 to process PROC4 then accepts the waveform data and then performs the mapping of the bits into symbols to create a waveform constellation as modulated data.

Flow 5 directs the modulated data from PROC4 to process PROC5 then accepts the modulated data and then performs proper filtering and pulse shaping.

Flow 6 directs the pulse shaped waveform data from PROC5 to an edge device where it is accepted and transmitted to over an IF or RF radio link.

Each of the processes PROC1 to PROCn are shown as representations of the ability to process a waveform and is not meant to show the exact sequence or process how any one waveform would be processed. In many cases, additional process such as encryption, decryption, and transport security (TRANSEC) may exist as a module that would be represented as an PROCn process.

In a preferred embodiment, the entire waveform creation, processing, manipulation, etc. that is traditionally supported by a purpose built device or a semi-purpose built hardware platform to support a software defined modem (SDM) or software defined radio (SDR) that relies on purpose or semi-purpose built hardware can be entirely replaced by a cloud computing application implemented in a high-level coding language such as, but not limited to OpenCL or starting with an ISO C99 high-level programming language such as C, C++, etc. and converting to OpenCL (or similar language). Any and all functions that could be supported by a purpose built modulator, demodulator, or modem can be created or represented as a high-level programming language and supported on a HPC device inside a cloud computing environment. The entire architecture may be supported as a 100% digital waveform representation that is supported by a single hardware server with all processes being brought to bear on the waveform to form a modulator, demodulator, modulator/demodulator (Modem) or passed server to server and a process (one or more) acts on the waveform as it traverses the cloud computing environment. It should be noted that the PROC1, PROC2, PROC3 . . . . PROCn (processes and/or applications) are functional blocks or algorithms running on the CPU (×86) or any one of the hardware acceleration units, such as FPGA, GPU, or DSP, that combined constitute the implementation of a communications waveform. The functional blocks are targeted for particular HPC resource according to the performance profiling of the waveform, which identifies algorithms that need to be hardware accelerated to achieve performance comparable to purpose built hardware.

The benefits of the described invention over the purpose built modem or purpose built SDR board is as follows:

Provides a resilient architecture—if a path becomes compromised, the path is rerouted through additional resources with the cloud computing environment.

Provides redundant waveform processing resources—if a path or server becomes unavailable, it is rerouted through additional resources with the cloud computing environment.

Provides nearly unlimited waveform processing power—if a waveform being processed reaches the limit of processing on a server, then the resources of another server or servers within the cloud computing environment.

Provides ephemeral operation—if the waveform process is only required for use for brief period of time, the waveform may be processed and torn down forever, brief period of time (repeated), or moved to a new location.

Provides an abstracted hardware platform—the high-level waveform processing may be performed in a manner that is not dependent on the hardware resources of a particular server or manufacturer's technology.

Provides a secure processing environment—the specifics, complexities, and resources are not exposed to the outside world and are not able to be physically stolen or exposed to an unfriendly person, organization, or adversary In an alternate embodiment, the entire waveform creation, processing, manipulation, etc. that is traditionally supported by a purpose built device or a semi-purpose built hardware platform to support an SDM or SDR can be entirely replaced with a cloud computing application implemented in a high-level coding language such as, but not limited to OpenCL or starting with C, C++, etc. and converting to OpenCL (or similar language) and each processing function. Any and all functions that could be supported by a propose built modulator, demodulator, or demodulator can be created or represented as a high-level programming language and supported on a HPC device inside a cloud computing environment. At the end of the waveform creation or waveform reception, an edge device may be used to perform the conversion to and from an analog format. For the transmit chain, the resulting all-digital waveform would be converted from all-digital to an analog format by the edge device by a hardware device known as a Digital to Analog Convert (DAC). Conversely, for the receive chain, the edge device would receive an analog signal and then cover the analog signal to digital with a hardware device known as an Analog to Digital Converter (ADC). Once the conversion process has been performed, the entire process and flow would be as is described in this disclosure.

The interface between the final cloud computing module and the edge device requires a framing format that provides for ensuring the messages being sent between the cloud computing environment and the edge device are:

Directed to the correct destination or received from a known edge device

Error free operation which may require FEC protection on the data flow

Sequential order of all data with no missing or out of order frames/packets

Time stamping of all data or a known amount of time/delay can be accounted for to ensure frames/packets containing digital waveform I/Q data are not arriving too late or overflowing Encrypted data flows may be utilized A flow control mechanism may be utilized to slow down or speed up the passing of digital I/Q data The benefits of the described invention over the purpose built modem or purpose built SDR board is as follows:

Provides an edge device that can be placed at any location with access to the Internet or cloud edge.

Provides an architecture that scales as the processing technology improves. The edge device is simply a conversion device and will convert a waveform encoded as a digital stream (I/Q samples) to or from the final analog format. The complexity of the waveform processing remains within the cloud computing fabric.

Provides a secure processing environment—only the modulated digital I/Q waveform data is required to pass to and from the edge device while the complexities and resources are not exposed to the outside world and are not able to be physically stolen or exposed to an unfriendly person, organization, or adversary.

EXAMPLES

The following are particular implementations with optimization techniques for all-digital cloud computing modem and the use of these methods are provided as non-limiting examples.

Example 1

A user requires data to be passed to an end satellite station. Using the described invention, a flow is created to encapsulate the user data for transport over the network as Ethernet frames and/or IP packets to the data center. Furthermore, the IP cores (processes) are distributed throughout the cloud computing environment. All components that comprise a complete digital modem are established and initialized and digital sampled I/Q waveform data connection is established to a satellite teleport with all-digital I/Q capability. The end user of the required data is located at the end of a satellite link. A repeating relay satellite enables communications between the satellite teleport and end satellite receiving station. The all software digital modem (created by the cloud computing IP cores application/process) is enabled and a communications path is established to the end user and the data is transferred.

Example 2

In particular implementations of the system described in example 1, a return path may be established from the end user satellite terminal where a communications path back from the remote satellite terminal, over the satellite, to the satellite earth station, and the digital I/Q waveform stream is received, demodulated, decoded, error checked, possibly decrypted, and passed to the original data user.

Example 3

A user requires data to be passed to an end tactical radio user. Using the described invention, a flow is created to encapsulate and transport user data to the data center. Furthermore, the IP cores (applications/processes) are distributed throughout the cloud computing environment. All components that comprise a complete digital modem are established and initialized and digital I/Q waveform connection is established to a tactical radio base station with all-digital I/Q waveform capability. The end user of the required data is located at the end of tactical radio link. A line of site communications path allows communications between the base station and end radio user. The all software digital modem (created by the cloud computing IP cores applications/processes) is enabled and a communications path is established to the end user and the data is transferred.

Example 4

In particular implementations of the system described in example 3, a return path may be established from the end user tactical radio where a communications path back from the remote tactical radio (hand held user), over free space, to the tactical radio base station, and the digital I/Q stream is received, demodulated, decoded, error checked, possibly decrypted, and passed to the original data user.

Example 5

A user requires data to be passed to an end satellite station. Using the described invention, a flow is created to encapsulate and transport the user data as Ethernet frames and/or IP packets over the network to the data center. Furthermore, the IP cores (applications/processes) are distributed throughout the cloud computing environment. All components that comprise a complete digital modem are established and initialized and digital I/Q waveform data connection is established to an edge device supporting satellite communications via digital sampled I/Q data capability. The end user of the required data is located at the end of a satellite link. A repeating relay satellite enables communications between the edge device supporting satellite capabilities and end satellite receiving station. The all software digital modem (created by the cloud computing IP cores) is enabled and a communications path is established to the end user and the data is transferred.

Example 6

In particular implementations of the system described in example 5, a return path may be established from the end user satellite terminal where a communications path back from the remote satellite terminal, over the satellite, to the edge device with satellite capabilities, and the digital I/Q stream is received, demodulated, decoded, error checked, possibly decrypted, and passed to the original data user.

Example 7

A user requires data to be passed to an end tactical radio user. Using the described invention, a flow is created to encapsulate and transport the user data as Ethernet frames and/or IP packets over the network to the data center. Furthermore, the IP cores (applications/processes) are distributed throughout the cloud computing environment. All components that comprise a complete digital modem are established and initialized and digital I/Q waveform data connection is established to an edge device supporting a tactical radio with all-digital sampled I/Q capability. The end user of the required data is located at the end of tactical radio link. A line of site communications path allows communications between the edge device supporting tactical radio capabilities and end radio user. The all software digital modem (created by the cloud computing IP cores) is enabled and a communications path is established to the end user and the data is transferred.

Example 8

In particular implementations of the system described in example 7, a return path may be established from the end user tactical radio where a communications path back from the remote tactical radio (hand held user), over free space, to the edge device supporting tactical radio capabilities, and the digital I/Q stream is received, demodulated, decoded, error checked, possibly decrypted, and passed to the original data user.

What is claimed is:

1. A modem system comprising:
   a modulation subsystem including;
   a computer device programmed to accept user data as a framed user data stream;
   a forward error correction application programmed to perform bit correction of said framed user data stream;
   a format conversion application programmed to convert the user data from parallel to serial format;
   a mapping application programmed to convert the serial formatted framed user data stream into a first modulated user data stream;
   a filter application programmed to electronically filter the first modulated user data stream; and,
   a digital-to-analog converter configured to convert the first filtered modulated user data stream into a first analog modulated communication waveform;
   wherein the forward error correction application, the format conversion application, the mapping application, and the filter application are each program supported by at least one HPC server having at least one central processing unit (CPU); and,
   a demodulation subsystem programmed to receive a second analog modulated communication waveform including:
   an analog-to-digital signal converter configured to convert the second analog modulated communication waveform into a second modulated user data stream;
   a gain/attenuation application;
   a demodulation application programmed to convert the second modulated user data stream into demapped data bits;
   a forward error correction (FEC) application;
   an error checking application; and,
   a deframing application programmed to remove the framing format of the second modulated user data stream;
   wherein the gain/attenuation application, the demodulation application, the forward error correction application, the error checking application, and the deframing application are supported by the at least one HPC server, and
   an integrated edge device, said edge device being adapted such that at the end of waveform creation or waveform reception, said edge device is used to perform conversion to and from an analog format, and further wherein for a transmit chain, the resulting all-digital waveform would be converted from digital to an analog format by the edge device by a Digital to Analog Convert (DAC), and conversely, for a receive chain, the edge device would receive an analog signal and then convert the analog signal to digital with an Analog to Digital Converter (ADC).

2. The modem system of claim 1 wherein said edge device transmits said first analog modulated communication waveform and receives said second analog modulated communication waveform.

3. A method of transmitting and receiving one or more modulated communication waveforms utilizing a modem system having a modulation subsystem and demodulation subsystem, the method comprising:
   accepting a user data stream by said modulation subsystem;
   framing said user data stream;
   performing bit correction of said framed user data stream;
   converting said user data stream from parallel to serial format;
   transforming said serial formatted framed user data stream into a first modulated user data stream;

filtering the first modulated user data stream;

converting said first filtered modulated user data stream into a first analog modulated communication wave form; and, transmitting said first analog modulated communication waveform;

wherein the modulation subsystem modulating said user data stream includes a forward error correction application, a format conversion application, a mapping application, and a filter application is executed by a modulating subsystem; and, wherein each application of said modulation subsystem is written in high level programming language and supported by at least one High Performance Computing (HPC) server with at least one CPU and at least one hardware acceleration device to achieve real-time processing;

receiving a second analog modulated communication waveform by said demodulation subsystem;

converting said second analog modulated communication waveform into a second modulated user data stream;

changing the second modulated user data stream into demapped data bits;

performing error correction on said second modulated user data stream; and, removing the framing format of said second modulated user data stream;

wherein the demodulation subsystem processing the second analog modulated communication waveform includes a gain/attenuation application, a demodulation application, a forward error correction application, an error checking application, and a deframing application; and wherein each application of said demodulation subsystem is written in high level programming language utilizing at least one High Performance Computing (HPC) server and at least one hardware acceleration device to achieve real time processing.

4. The method of claim 3, further comprising performing conversion to and from analog format using an integrated edge device at the end of waveform creation or waveform reception, and further wherein for a transmit chain, the resulting all-digital waveform is converted from digital to an analog format by the edge device by a Digital to Analog Convert (DAC), and conversely, for a receive chain, the edge device would receive an analog signal and then convert the analog signal to digital with an Analog to Digital Converter (ADC).

5. A computer program product comprising at least one non-transitory computer-readable medium, the computer-readable medium comprising a program which, when executed by a modem system having a modulation subsystem and a demodulation subsystem causes the modem system to perform a method transmitting and receiving one or more modulated communication waveforms, wherein said method is a method of claim 3.

6. A computer program product comprising at least one non-transitory computer-readable medium, the computer-readable medium comprising a program which, when executed by a modem system having a modulation subsystem and a demodulation subsystem causes the modem system to perform a method transmitting and receiving one or more modulated communication waveforms, wherein said method is a method of claim 4.

* * * * *